N. Long. Table Leaves Supports

72871

PATENTED
DEC 31 1867

Witnesses.

Inventor.
N. Long

United States Patent Office.

NATHAN LONG, OF EATON, INDIANA.

Letters Patent No. 72,871, dated December 31, 1867.

IMPROVED TABLE-LEAVES SUPPORT.

*The Schedule referred to in these Letters Patent and making part of the same.*

TO ALL WHOM IT MAY CONCERN:

Be it known that I, NATHAN LONG, of Eaton, in the county of Delaware, and State of Indiana, have invented a new and useful Improvement in Table-Leaves Supports; and I do hereby declare that the following is a full, clear, and exact description thereof, which will enable others skilled in the art to make and use the same, reference being had to the accompanying plate of drawings, forming a part of this specification, in which—

Similar letters of reference indicate corresponding parts.

This invention relates to an improvement in table-leaves, and consists in an arrangement of the supports in connection with springs, whereby they are rendered self-acting, and, when the leaves are raised, will take their place under them, to hold them up in the usual way, as hereinafter more particularly described.

Figure 1:
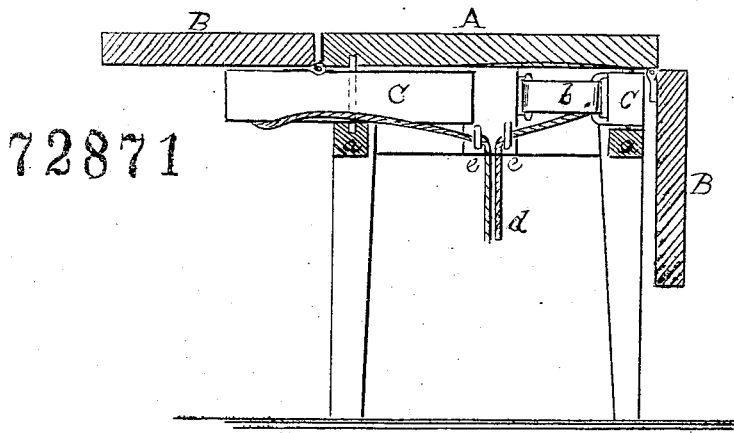
Figure 1 represents a vertical cross-section of my improved table through the line $x\ x$, fig. 2.
Figure 2:
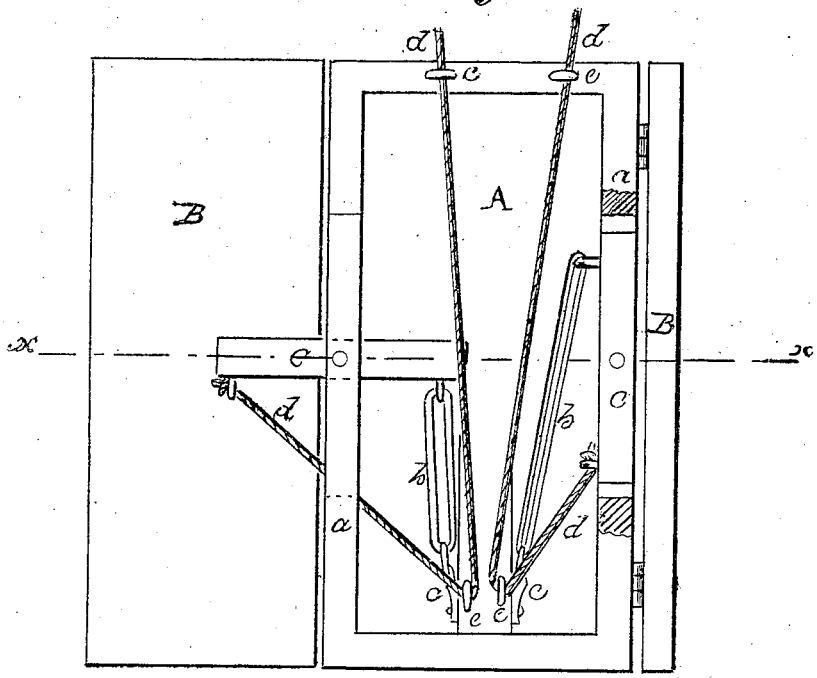
Figure 2 is an inverted plan view.

The drawing represents a two-leaved table; A the bed, and B B the falling leaves, hung to the top by hinges in the ordinary manner. The leaves-supports C C are let into the side rails $a\ a$, to be flushed with them on the upper edges, and are pivoted centrally, so that they can be swung around and lie over the side rails, to allow the leaves to hang down or crosswise, with one end under a leaf, to keep it up, as shown in fig. 2. Springs $b\ b$, made of rubber or spiral wire, are attached to the inner ends of the supports C C, and to the under side of the bed, at one end, at $c$, by which springs the outer ends of the supports are thrown out under the leaves, when they, or either of them, are raised. Cords $d\ d$ are fastened to the outer ends of the supports C C, and pass through staples $e\ e$, to hang in such a manner, at one end of the table, that they can be pulled easily to draw the outer ends of the supports back, for the purpose of letting down the leaves of the table.

Having thus described my invention, I claim as new, and desire to secure by Letters Patent—

The combination of the self-acting supports C with the springs $b\ b$ and cords $d\ d$, constructed, arranged, and operating as and for the purpose herein shown and described.

NATHAN LONG.

Witnesses:
JOHN COUTTER,
JAMES LONG.